United States Patent
Wright, IV

(10) Patent No.: US 8,069,578 B1
(45) Date of Patent: Dec. 6, 2011

(54) LASER TOOL MOUNTING ASSEMBLY AND METHOD OF USE

(76) Inventor: Wilkinson D. Wright, IV, Pembroke Pines, FL (US)

( * ) Notice: Subject to any disclaimer, the term of this patent is extended or adjusted under 35 U.S.C. 154(b) by 0 days.

(21) Appl. No.: 11/999,110

(22) Filed: Dec. 4, 2007

Related U.S. Application Data

(60) Provisional application No. 60/872,739, filed on Dec. 4, 2006.

(51) Int. Cl.
*G01C 15/00* (2006.01)

(52) U.S. Cl. ...................................... 33/286; 33/DIG. 21

(58) Field of Classification Search .................... 33/286, 33/DIG. 21, 1 N, 281–283, 291, 227; 248/183.2, 248/349.1, 542, 683, 558, 458, 467, 130–131, 248/425, 429, 371, 923
See application file for complete search history.

(56) References Cited

U.S. PATENT DOCUMENTS

| | | | | |
|---|---|---|---|---|
| 5,836,081 | A * | 11/1998 | Orosz, Jr. | 33/290 |
| 6,012,229 | A * | 1/2000 | Shiao | 33/365 |
| 6,163,969 | A * | 12/2000 | Jan et al. | 33/282 |
| 6,481,686 | B1 * | 11/2002 | Jan | 248/349.1 |
| 7,013,570 | B2 * | 3/2006 | Levine et al. | 33/286 |
| 7,269,907 | B2 * | 9/2007 | Levine et al. | 33/286 |
| 7,367,129 | B2 * | 5/2008 | Lu | 33/286 |
| 2002/0083603 | A1 * | 7/2002 | Jang | 33/281 |
| 2004/0255477 | A1 * | 12/2004 | Levine et al. | 33/286 |
| 2005/0155238 | A1 * | 7/2005 | Levine et al. | 33/286 |
| 2006/0016083 | A1 * | 1/2006 | Huang | 33/286 |
| 2007/0169359 | A1 * | 7/2007 | Lin | 33/286 |

\* cited by examiner

*Primary Examiner* — Yaritza Guadalupe-McCall
(74) *Attorney, Agent, or Firm* — Frank L. Kubler

(57) ABSTRACT

A laser mounting assembly for mounting a laser tool to a mounting surface such as a wall to adjacent to an end of a mounted first molding segment and orienting the laser tool to project a beam of light from a point aligned with a longitudinal edge of the first molding segment along the mounting surface to locate and permit marking of the position of a second molding segment longitudinal edge includes a laser tool distal end for mounting to a support surface and having a laser tool proximal end. The laser mounting assembly includes a mounting plate for securing to a mounting surface; and includes a backing panel for fastening to the laser tool distal end, such as with adhesive, the backing panel having a direction indicator along the panel periphery which extends laterally to an extent that it is visible to an observer at the laser tool proximal end. A method of assembly use is also provided.

9 Claims, 4 Drawing Sheets

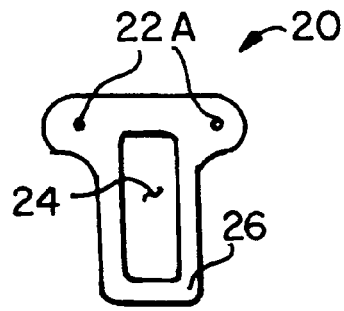
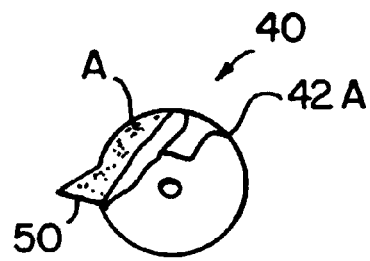
FIG.1  FIG.2
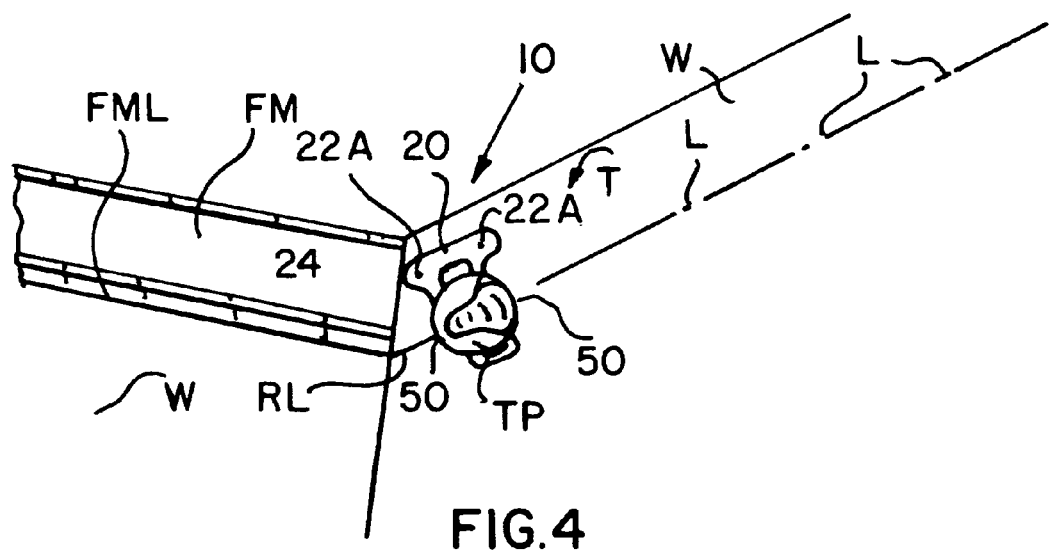
FIG.4

LASER TOOL MOUNTING ASSEMBLY AND METHOD OF USE

FILING HISTORY

This application continues from provisional patent application Ser. No. 60/872,739, filed on Dec. 4, 2006.

BACKGROUND OF THE INVENTION

1. Field of the Invention

The present invention relates generally to the field of molding installation. More specifically the present invention relates to a laser mounting assembly for mounting a laser tool to a mounting surface such as a wall to adjacent to an end of a mounted first molding segment or a segment location marking and orienting the laser tool to project a beam of light from a point aligned with a longitudinal edge of the first molding segment or segment location marking along the mounting surface to locate and permit marking of the position of a second molding segment longitudinal edge, the laser tool having a laser tool distal end for mounting to a support surface and having a laser tool proximal end. The laser mounting assembly includes a mounting plate for securing to a mounting surface; and includes a backing panel magnetically attracted to the mounting plate, for fastening to the laser tool distal end, such as with adhesive, the backing panel having a direction indicator along the panel periphery which extends laterally to an extent that it is visible to an observer at the laser tool proximal end for directing toward the segment longitudinal edge or location marking, tag laser tool is oriented to project a beam of light exactly opposite from the direction indicator.

A method of assembly use is also provided including the steps of: fastening the mounting plate to a mounting surface adjacent to an end of a first molding segment; securing the backing panel to a laser tool distal end; placing the backing panel against the mounting plate so that magnetic attraction removably retains and supports the laser tool and backing panel against the mounting plate; and orienting the backing panel so that the direction indicator is directed in alignment with the first molding segment longitudinal edge or location marking; activating the laser tool to cause the laser tool to project a beam of light along the mounting surface in a direction opposite that of the direction indicator.

A second embodiment of the laser mounting assembly is provided which has a mounting structure rather than a mounting plate, the mounting structure having an outward mounting structure connection wall with an engagement slot having a slot wider end and a slot spacing structure spacing the mounting structure connection wall from the building wall, the slot spacing structure preferably including a mounting wall for abutting the building wall and fastener ports for passing mounting structure fasteners into and thus fastening the mounting structure to the building wall. A backing box replaces the backing panel. The backing box includes a tool engaging wall having an engaging wall external surface covered with an adhesive which in turn is and initially covered by a removable cover sheet, a backing box connection wall spaced from and parallel with the tool engaging wall for abutting the mounting structure connection wall, a circumferential backing box side wall interconnecting the tool engaging wall and the backing box connection wall and shaped to include a direction indicator preferably in the form of a V-shaped protrusion, and at least one retractably biased slot engagement stem having a cone-shaped slot engagement head protruding outwardly through the tool engaging wall and into the slot wider end, whereupon the backing box and tool and moved laterally to slide the stem to the narrower part of the slot where the slot engagement head engaged behind the mounting structure connection wall. The slot engagement stem preferably is biased with a coil spring, but may be biased by any other suitable means as well.

2. Description of the Prior Art

There have long been laser tools such as laser levels for placement against a surface such as a wall of a building to project a beam of light to locate a position along the surface. A problem with these laser tools has been that they are not suited, in themselves, to project light from corner to corner of a building wall to locate an edge of a molding segment, such as of a crown molding segment.

It is thus an object of the present invention to provide a laser tool mounting assembly which establishes a straight line from corner to corner of a building interior wall so that ceiling imperfections are less conspicuous, while permitting unrestricted mobility of the laser during alignment of corner reference lines.

It is another object of the present invention to provide such a laser tool mounting assembly which works on all wall materials including plaster.

It is still another object of the present invention to provide such a laser tool mounting assembly which produces no visible damage to the building wall, permits easy vertical adjusting due to metal and magnet design.

It is finally an object of the present invention to provide such a laser tool mounting assembly which can be used by a single installer working alone, which is compact and inexpensive to manufacture.

SUMMARY OF THE INVENTION

The present invention accomplishes the above-stated objectives, as well as others, as may be determined by a fair reading and interpretation of the entire specification.

A laser mounting assembly is provided for mounting a laser tool to a mounting surface such as a wall adjacent to an end of a mounted first molding segment or a segment location marking and orienting the laser tool to project a beam of light from a point aligned with a longitudinal edge of the first molding segment or segment location marking along the mounting surface to locate and permit marking of the position of a second molding segment longitudinal edge, the laser tool having a laser tool distal end for mounting to a support surface and having a laser tool proximal end. The laser mounting assembly includes a mounting plate for securing to a mounting surface; and includes a backing panel for fastening to the laser tool distal end, such as with adhesive, the backing panel having a direction indicator along the panel periphery which extends laterally to an extent that it is visible to an observer at the laser tool proximal end for directing toward the segment longitudinal edge or location marking, the laser tool is oriented to project a beam of light exactly opposite from the direction indicator.

A method of assembly use is also provided including the steps of: fastening the mounting plate to a mounting surface adjacent to an end of a first molding segment; securing the backing panel to a laser tool distal end; placing the backing panel against the mounting plate so that magnetic attraction removably retains and supports the laser tool and backing panel against the mounting plate; and orienting the backing panel so that the direction indicator is directed in alignment with the first molding segment longitudinal edge or location marking; activating the laser tool to cause the laser tool to project a beam of light along the mounting surface in a direction opposite that of the direction indicator.

BRIEF DESCRIPTION OF THE DRAWINGS

Various other objects, advantages, and features of the invention will become apparent to those skilled in the art from the following discussion taken in conjunction with the following drawings, in which:

FIG. 1 is a proximal view of the preferred mounting plate.

FIG. 2 is a proximal view of the preferred backing panel.

FIG. 4 is a perspective view of a building interior corner and of the assembly and laser tool being used to project a beam of light from a first molding segment longitudinal edge to locate the proper position of an adjacent second molding segment longitudinal edge.

DETAILED DESCRIPTION OF THE PREFERRED EMBODIMENTS

Figure 3:
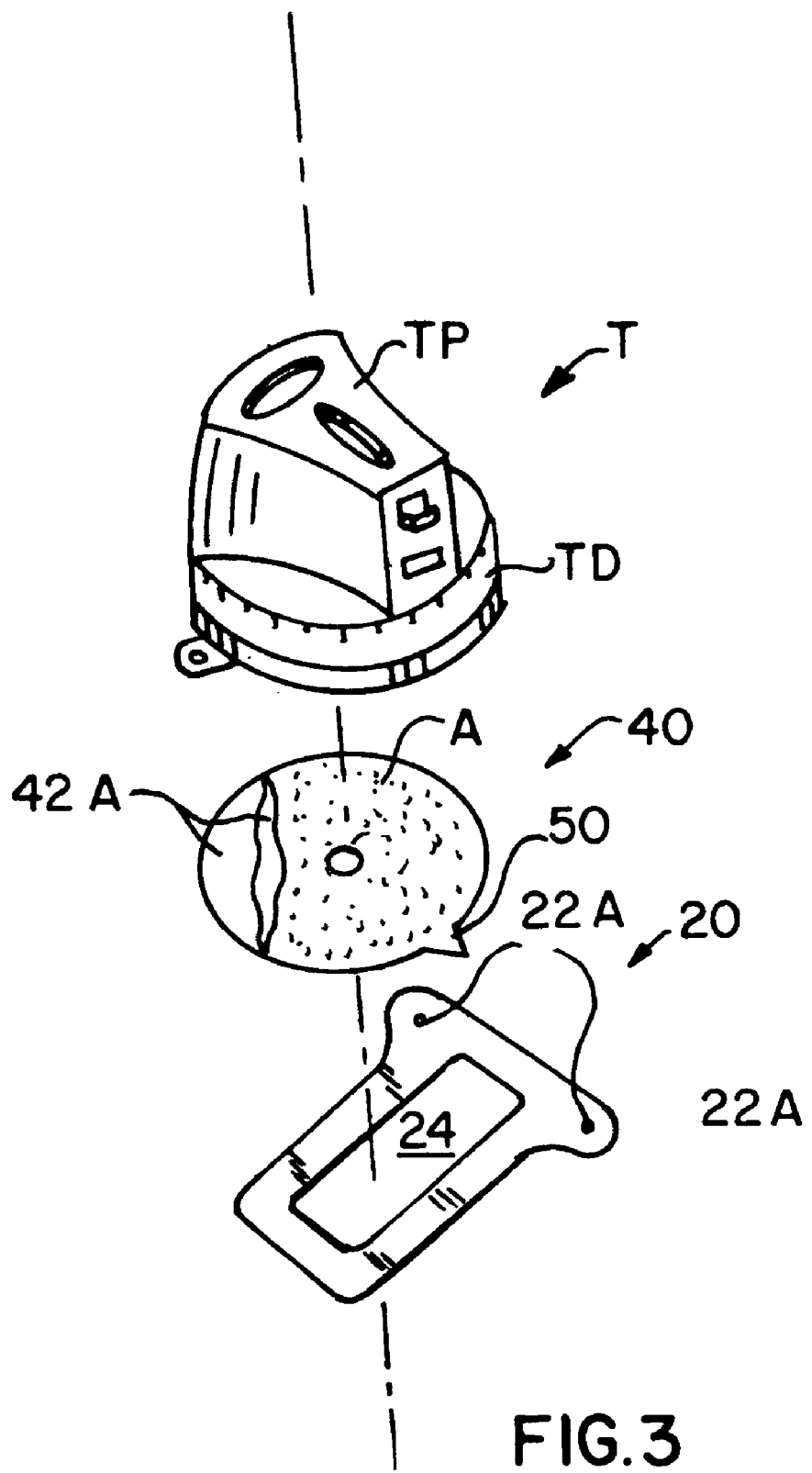
FIG. 3 is an exploded view of the first embodiment of the assembly and laser tool.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-4, a laser mounting assembly 10 is disclosed for mounting a laser tool T to a mounting surface W such as a building wall adjacent to an end of a mounted first molding segment FM or a segment location marking and for orienting the laser tool T to project a beam of light L from a point aligned with a longitudinal edge FML of the first molding segment FM or segment location marking along the mounting surface W to locate and permit marking of the position of a corresponding longitudinal edge SML of a second molding segment SM, the laser tool T having a laser tool distal end TD for mounting to a support surface W and having a laser tool proximal end TP. An example of a suitable laser tool T is the STRAIGHT-LINE LASER LEVEL 120™.

The laser mounting assembly 10 includes a metal mounting plate 20 having a plate peripheral region 22 with fastener passing openings 22A for securing the plate 20 to a mounting surface W adjacent to an end of a first molding segment FM and having a plate central magnet region 24. The laser mounting assembly 10 further includes a backing panel 40 for fastening to the laser tool distal end TD, such as with adhesive A, the backing panel 40 having a direction indicator 50 which extends laterally relative to the laser tool distal end TD to an extent that it is visible to an observer at the laser tool proximal end TP for directing toward the segment longitudinal edge FML or location marking, the laser tool is oriented to project a beam of light exactly opposite from the indicator 50 direction. The backing panel 40 preferably has a panel mounting face 42 covered with an adhesive A with a removable cover sheet 42A placed over the adhesive A which is peeled away and the panel mounting face 42 subsequently pressed against and thereby bonded to the laser tool distal end TD. The backing panel 40 preferably is a disk of magnetic material which may be either flexible or rigid. The direction indicator 50 preferably is either a peripheral panel tab tapering radially to a point as shown in FIG. 3, or is a peripheral panel notch (not shown) in the backing panel 40. The backing panel 40 on the laser tool T permits unrestricted mobility of the laser tool T while aligning corner reference lines.

The backing panel 40 may have any of a wide variety of shapes other than the disk-shape. It is contemplated that the mounting plate 20 be a magnet and the backing panel 40 be a magnet as well, and alternatively that the mounting plate 20 be a magnet and the backing panel 40 be a metal attracted to a magnet, and still alternatively that the backing panel 40 be a magnet and the mounting plate 20 be a metal attracted to a magnet.

Method

In practicing the invention, the following method may be used. A method of assembly 10 use for the first embodiment is also provided including the steps of: fastening the mounting plate 20 to a mounting surface W adjacent to an end of a first molding segment FM; securing the backing panel 40 to a laser tool distal end TD; placing the backing panel 40 against the mounting plate 20 so that magnetic attraction removably retains and supports the laser tool T and backing panel 40 against the mounting plate 20; and orienting the backing panel 40 so that the direction indicator 50 is directed in alignment with the first molding segment longitudinal edge FML or location marking; activating the laser tool T to cause the laser tool T to project a beam of light along the mounting surface W in a direction opposite that of the direction indicator 50.

Second Preferred Embodiment

Figure 5:
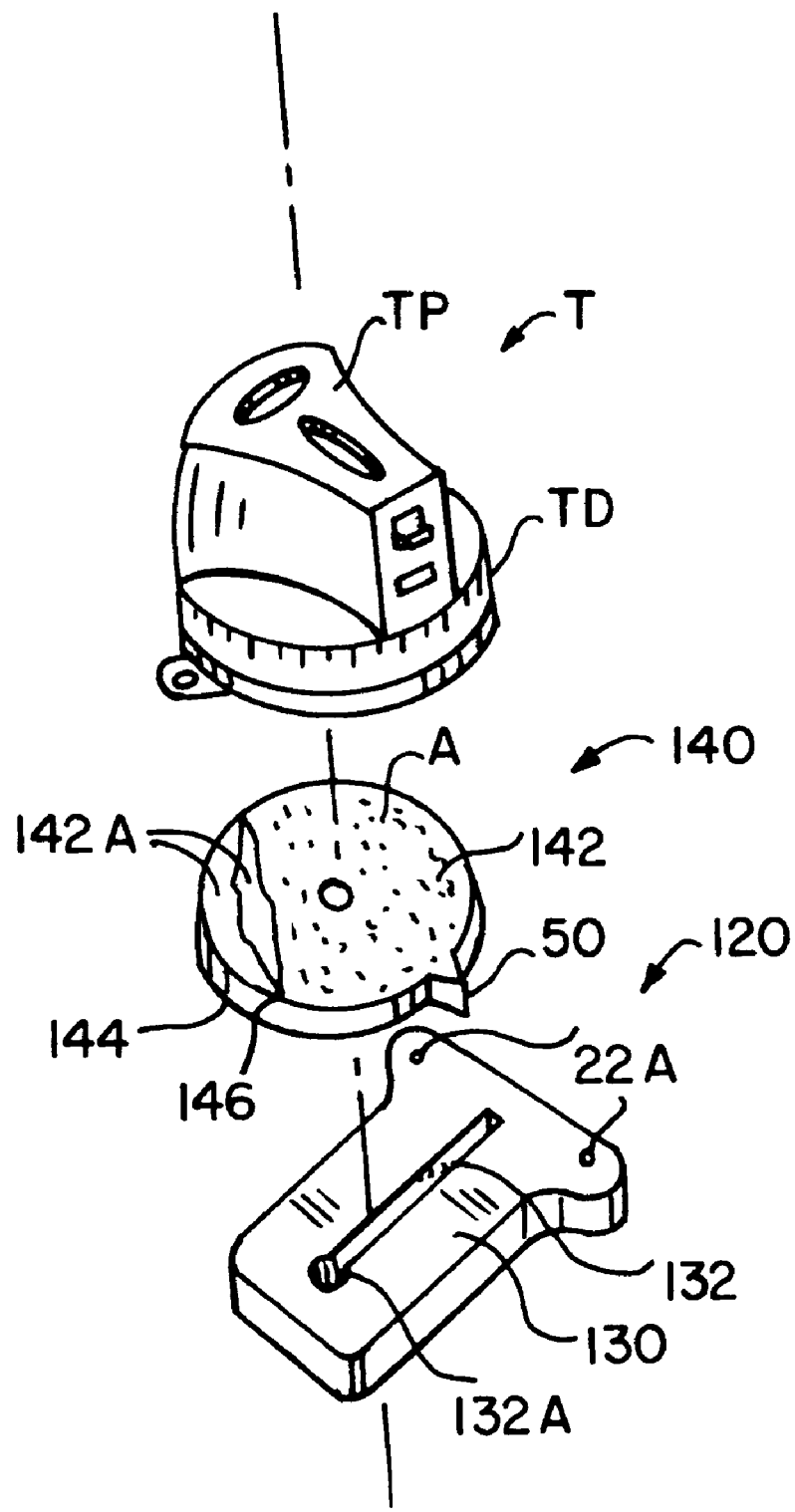
FIG. 5 is an exploded view of the second embodiment of the assembly and laser tool.
Figure 6:
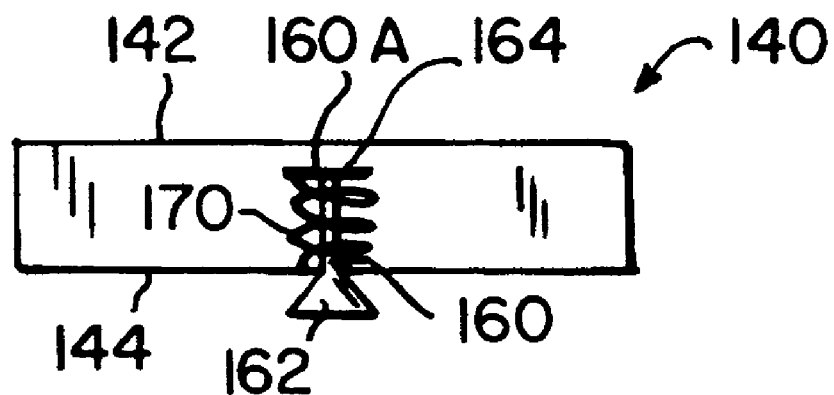
FIG. 6 is a cross-sectional side view of the preferred backing box, revealing the engagement stem, spring abutment flange and spring.
Figure 7:
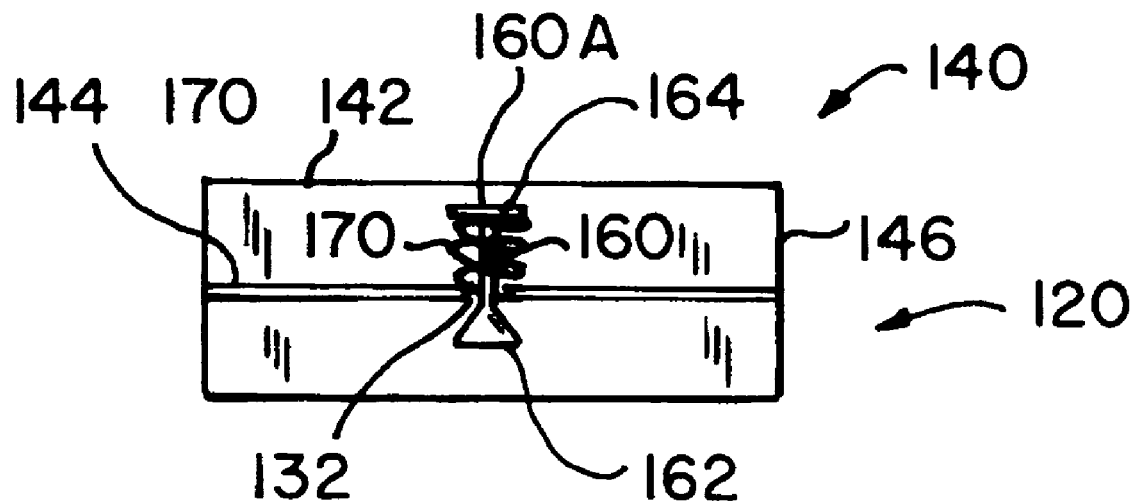
FIG. 7 is a cross-sectional side view of the preferred backing box and abutting mounting structure, showing the engagement stem within the engagement slot and the stem head inside the mounting structure, so that the backing box is releasable secured to the mounting structure.

A second embodiment of the laser mounting assembly 10 is provided which has a mounting structure 120 rather than a mounting plate 20, the mounting structure 120 having an outward mounting structure connection wall 130 with an engagement slot 132 having a slot wider end 132A and a slot spacing structure spacing the mounting structure connection wall 130 from the building wall W, the slot spacing structure preferably including a mounting wall 134 for abutting the building wall W and fastener ports for passing mounting structure fasteners into and thus fastening the mounting structure 120 to the building wall W. See FIGS. 5-7.

A backing box 140 replaces the backing panel 40. The backing box 140 includes a tool engaging wall 142 having an engaging wall 142 external surface covered with an adhesive A which in turn is and initially covered by a removable cover sheet 142A, a backing box connection wall 144 spaced from and parallel with the tool engaging wall 142 for abutting the mounting structure connection wall 130, a circumferential backing box side wall 146 interconnecting the tool engaging wall 142 and the backing box connection wall 144 and shaped to include a direction indicator 50 preferably in the form of a V-shaped protrusion, and at least one retractably biased slot engagement stem 160 having a cone-shaped slot engagement head 162 protruding outwardly through the tool engaging wall 142. Slot engagement stem 160 preferably is biased with a coil spring 170, but may be biased by any other suitable means as well. The slot engaging stem 160 preferably passes slidably through a port in the backing box connection wall 144 and has a stem biasing end 160A inside the backing box 140 with a radial spring abutment flange 164, and the coil spring 170 is fitted around the engagement stem 160 inside the backing box 140 and is compressed between and abuts the spring abutment flange 164 and the mounting structure connection wall 130. Coil spring 170 alternatively may be a leaf spring or any other suitable biasing means. It is contemplated that these or other embodiments of assembly 10 be combined with laser tool T during manufacture, and alternatively that assembly 10 be manufactured separately from laser tool T as an after market product.

Method

In practicing the invention, the following method may be used. A method of assembly 10 use for the second embodiment is also provided including the following steps. The slot engagement head 162 is fitted into the engagement slot 132 at the slot wider end 132A, and then the back box 140 and the connected laser tool are pulled laterally to advance the engagement stem 160 along the engagement slot 132 away from the slot wider end 132A so that the spring 170 pulls the engagement head 162 against the engagement slot 132 edges, pulling the backing box 140 into high friction abutment and engagement with the outward mounting structure connection wall 130 of the mounting structure 120.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A laser mounting tool for mounting a laser tool to a wall to adjacent to an end of a mounted first molding segment and for orienting the laser tool to project a beam of light from a point aligned with a longitudinal edge of the first molding segment along the wall to locate and permit marking of the position of a corresponding second molding segment longitudinal edge comprising:
   a laser tool distal end for mounting to a support surface and having a laser tool proximal end;
   a mounting structure comprising a structure peripheral region with fastener passing openings for securing said mounting structure to a wall adjacent to an end of a first molding segment, and mounting structure slidable fastening means, and a backing structure for slidably fastening to said mounting structure slidable fastening means and for fastening to said laser tool distal end, said backing structure having a direction indicator extending laterally to an extent to be visible to an observer at the laser tool proximal end;
   such that said mounting structure slidable fastening means permits said backing structure, together with said laser tool fastened to said backing structure, to slide relative to said mounting structure and thus relative to a wall to which said mounting structure is mounted and also to be rotated relative to the wall to align the direction indicator on one side of the laser tool with an end of a first molding segment and to project a laser beam in an opposing direction for marking a position for a second molding segment.

2. The laser mounting tool of claim 1, wherein said backing structure comprises a backing panel having a panel mounting face covered with an adhesive with a removable cover sheet placed over the adhesive which is peeled away and said panel mounting face subsequently pressed against and thereby bonded to said laser tool distal end.

3. The laser mounting tool of claim 1, wherein said mounting structure comprises magnetic material.

4. The laser mounting tool of claim 1, wherein said direction indicator is one of: a peripheral panel tab tapering radially to a point and a peripheral panel notch in said backing structure.

5. The laser mounting tool of claim 1, wherein said backing structure comprises a backing panel is substantially circular.

6. The laser mounting tool of claim 1, wherein said mounting structure comprises an outward mounting structure connection wall with an engagement slot having a slot wider end and a slot spacing structure spacing the mounting structure connection wall from the building wall, and said slot spacing structure comprising a mounting wall for abutting said building wall and fastener ports for passing mounting structure fasteners into and thus fastening said mounting structure to said building wall.

7. A laser mounting tool for mounting a laser tool to a wall to adjacent to an end of a mounted first molding segment and for orienting the laser tool to project a beam of light from a point aligned with a longitudinal edge of the first molding segment along the wall to locate and permit marking of the position of a corresponding second molding segment longitudinal edge comprising:
   a laser tool distal end for mounting to a support surface and having a laser tool proximal end;
   a mounting structure comprising a structure peripheral region with fastener passing openings for securing said mounting structure to a wall adjacent to an end of a first molding segment, and a backing structure engagement slot, and a backing structure for fastening to said laser tool distal end, said backing structure comprising a backing box having a tool engaging wall with an engaging wall external surface, a backing box connection wall spaced from said tool engaging wall for abutting said mounting structure, a backing box side wall interconnecting said tool engaging wall and the backing box connection wall, and including a direction indicator and at least one slot engagement structure protruding outwardly from said backing box connection wall.

8. The laser mounting tool of claim 7, wherein said engagement slot has a slot wider end and a slot narrower end and wherein said slot engagement structure passes slidably through said backing structure engagement slot in said mounting structure and comprises a stem biasing end inside said mounting structure with a radial spring abutment flange, and a coil spring fitted around the engagement stem inside said backing box and is compressed between and abuts the spring abutment flange and said mounting structure, and wherein said slot engagement structure comprises a slot engagement head which is fitted into said engagement slot at said slot wider end, and then said backing box and the connected said laser tool are moved relative to said mounting structure laterally to advance said engagement stem along said engagement slot away from said slot wider end such that said spring pulls said engagement head against said engagement slot edges, pulling said backing box into high friction abutment and engagement with said mounting structure.

9. A method of using a laser mounting tool mounting a laser tool to a wall to adjacent to an end of a mounted first molding segment and for orienting the laser tool to project a beam of light from a point aligned with a longitudinal edge of the first molding segment along the wall to locate and permit marking of the position of a corresponding second molding segment longitudinal edge comprising a laser tool distal end for mounting to a support surface and having a laser tool proximal end; a mounting structure comprising a structure peripheral region with fastener passing openings for securing said mounting structure to a wall adjacent to an end of a first molding segment and backing structure sliding fastening means, and a backing structure for fastening to said laser tool distal end, said backing structure having a panel peripheral edge with a direction indicator along said panel peripheral edge extending laterally to an extent to be visible to an observer at the laser tool proximal end comprising the steps of:

fastening the mounting plate to a mounting surface adjacent to an end of a first molding segment;

securing the backing structure to a laser tool distal end;

placing the backing structure against the mounting plate such that magnetic attraction removably retains and supports the laser tool and backing structure against the mounting plate;

rotating and sliding the backing structure and laser tool relative to the mounting structure such that the direction indicator is directed in alignment with one of the first molding segment longitudinal edge and a location marking;

and activating the laser tool to cause the laser tool to project a beam of light along the mounting surface in a direction opposite that of the direction indicator.

\* \* \* \* \*